Figure 1:
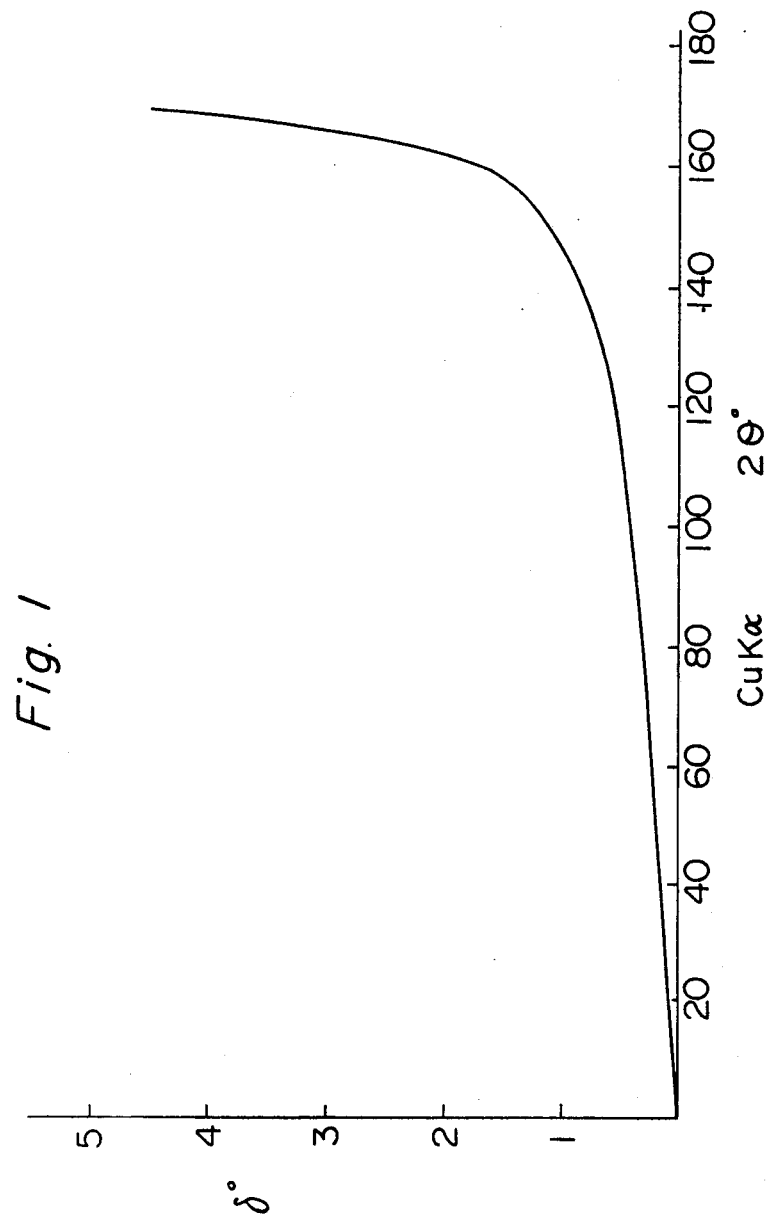

United States Patent [19]

Miyata et al.

[11] 4,145,404
[45] Mar. 20, 1979

[54] MAGNESIUM HYDROXIDES HAVING NOVEL STRUCTURE, PROCESS FOR PRODUCTION THEREOF, AND RESIN COMPOSITIONS CONTAINING THEM

[75] Inventors: Shigeo Miyata, Takamatsu; Masataka Kuroda, Kagawa; Akira Okada; Tosihumi Okazaki, both of Takamatsu; Mitsuo Takasu, Marugame, all of Japan

[73] Assignee: Kyowa Chemical Industry Co., Ltd., Tokyo, Japan

[21] Appl. No.: 850,380

[22] Filed: Nov. 10, 1977

Related U.S. Application Data

[62] Division of Ser. No. 690,778, May 27, 1976, Pat. No. 4,098,762.

[30] Foreign Application Priority Data

May 30, 1975 [JP] Japan ............................. 50/65049
Mar. 25, 1976 [JP] Japan ............................. 51/31919

[51] Int. Cl.$^2$ ............................................. C01F 5/14
[52] U.S. Cl. ............................................. 423/635; 423/497; 423/639
[58] Field of Search ................ 423/639, 635, 636, 164

[56] References Cited

U.S. PATENT DOCUMENTS

| | | | |
|---|---|---|---|
| 1,405,388 | 2/1922 | Bassett | 423/639 |
| 1,757,592 | 6/1930 | Schleicher | 23/290 |
| 2,804,375 | 8/1957 | Kamlet | 423/639 |
| 3,081,155 | 3/1963 | Dinan | 423/639 |
| 3,218,130 | 11/1965 | Kawai et al. | 423/639 |
| 3,711,600 | 1/1973 | Storm et al. | 423/639 |

FOREIGN PATENT DOCUMENTS

| | | | |
|---|---|---|---|
| 121345 | 4/1946 | Australia | 423/639 |
| 626503 | 7/1949 | United Kingdom | 423/636 |

OTHER PUBLICATIONS

Kirk–Othmer, Encyclopedia of Chemical Technology, Second Edition (Jun. 1969), vol. 12, pp. 724–731.

*Primary Examiner*—O. R. Vertiz
*Assistant Examiner*—Wayne A. Langel
*Attorney, Agent, or Firm*—Wenderoth, Lind & Ponack

[57] ABSTRACT

A novel magnesium hydroxide of the formula $Mg(OH)_2$ having (i) a strain in the <101> direction of not more than $3.0 = 10^{-3}$, (ii) a crystallite size in the <101> direction of more than 800 Å, and (iii) a specific surface area of less than 20 m$^2$/g. The magnesium hydroxide, if desired as coated $m^2$/g. The magnesium hydroxide, if desired as coated with anionic surfactants, is useful, for example, as fire retardants for thermoplastic synthetic resins and aqueous paints. The novel magnesium hydroxide is prepared by heating in an aqueous medium at an elevated pressure a novel basic magnesium chloride or nitrate of this invention expressed by the formula $Mg(OH)_{2-x}A_x \cdot mH_2O$ wherein A is Cl or $NO_3$, x is a number of more than 0 but less than 0.2, and m is a number of 0 to 6.

4 Claims, 3 Drawing Figures

MAGNESIUM HYDROXIDES HAVING NOVEL STRUCTURE, PROCESS FOR PRODUCTION THEREOF, AND RESIN COMPOSITIONS CONTAINING THEM

This is a division of application Ser. No. 690,778, filed May 27, 1976 now U.S. Pat. No. 4,098,762.

This invention relates to magnesium hydroxides, coated or uncoated with anionic surface active agents, which have a novel X-ray diffraction pattern different from those of known magnesium hydroxides $Mg(OH)_2$ and exhibit superior operations and effects in such uses as fire retardants for thermoplastic synthetic resins and aqueous paints, or precursors of magnesium oxide for an annealing-separator for ferrosilicon, as compared with conventional available magnesium hydroxides; novel basic magnesium chloride or basic magnesium nitrate as intermediates thereof; processes for producing them; and to their use.

More specifically, the invention relates to a magnesium hydroxide, uncoated or coated with an anionic surface active agent, expressed by the following formula $$Mg(OH)_2$$

which has a strain in the $<101>$ direction of not more than $3.0 \times 10^{-3}$, a crystallite size in the same direction of more than 800 Å, and a specific surface area, determined by the BET method, of less than 20 m$^2$/g; basic magnesium chloride or magnesium nitrate as its intermediate; processes for their preparation; and to their use, especially to a thermoplastic synthetic resin composition having improved properties such as superior fire retardancy or melt-shapability.

Magnesium hydroxide has been known from old, and used in a wide range of fields. For example, it is used to impart fire retardancy to thermoplastic synthetic resins. When it is incorporated in thermoplastic synthetic resins in an amount sufficient to impart a feasible fire-retarding effect to the resins, the physical properties of the resin, especially, impact strength or elongation, are deteriorated. Furthermore, the flow of the resin is reduced at the time of melt-shaping the resulting resin composition, and its shapability and shaping efficiency are reduced. Also, the resulting shaped articles frequently have a silver pattern which causes a poor appearance.

Our investigations led to the discovery that these defects are attributed to the structural characteristics which the conventional available magnesium hydroxides inherently have, especially to their strain, crystallite size and specific surface area.

As is well known, the conventional available magnesium hydroxides have a great strain, and their strain in the $<101>$ direction is $3.6 \times 10^{-3}$ at the least, and frequently reaches about $10 \times 10^{-3}$. The crystallite size of the conventional magnesium hydroxides is small, and about 700 Å at the largest, and generally in the range of 100 to 700 Å. Furthermore, they have a high surface area determined by the BET method, which is 20 m$^2$/g at the smallest, and in the range of 20 to 100 m$^2$/g. The great strain in the structure of magnesium hydroxide means that the polarity of the surface of the crystallites is large, and the crystallites tend to aggregate secondarily with water as a binder. Thus, secondary aggregation occurs readily, and the crystallites aggregate into particles with a size of 10 to 100 microns. Thus, even after the drying of magnesium hydroxide, the aggregate contains negligible amounts of water and air trapped therein. Since the conventional available magnesium hydroxides have such a great strain in their structure as mentioned above, the have poor affinity for thermoplastic synthetic resins, especially those having great hydrophobicity or small polarity, for example, polyolefins. In addition, presumably because of the strong aggregation of its crystallites, its dispersibility in resins is extremely poor. In fact, resin compositions containing the conventional available magnesium hydroxides have poor shapability and exhibit reduced shaping efficiency. Furthermore, the poor affinity of the magnesium hydroxides with resins tends to result in the occurrence of spaces in the interface between the resin and the magnesium hydroxide particles. This, in turn, causes the deterioration of the physical properties of the resin composition, especially impact strength or elongation, and makes it difficult to disperse the magnesium hydroxide uniformly in the resin. The presence of water molecules and air formed as a result of the secondary aggregation of the crystallites, causes a poor appearance to the resulting fabricated articles, for example, by the formation of a silver pattern, presumably because they are released at the time of fabrication. Accordingly, the melt shaping of the resins is difficult to perform smoothly, and the dispersion of the magnesium hydroxide in the resin becomes nonuniform.

We have made extensive investigations in an attempt to overcome the difficulties associated with the structural characteristics of the conventional available magnesium hydroxides, and consequently found that a magnesium hydroxide having new structural characteristics clearly distinguishable from those of the conventional magnesium hydroxide can be provided, and that this magnesium hydroxide having the new structure has superior properties and is free from the disadvantages of the conventional magnesium hydroxides. It has also been found that the magnesium hydroxide having the new structure can be produced advantageously on a commerical scale by a very simple means which has not been performed heretofore.

Accordingly, it is an object of this invention to provide a magnesium hydroxide having a new structure and improved properties.

Another object of this invention is to provide a process for producing a magnesium hydroxide having a new structure with commercial advantage.

Still another object of this invention is to provide intermediates useful for providing a magnesium hydroxide having a new structure, and a process for preparing the intermediates.

Still another object of this invention is to provide a magnesium hydroxide coated with an anionic surface active agent which exhibits more favorably improved properties for use as a fire retardant for thermoplastic synthetic resins.

A further object of this invention is to provide a use of a magnesium hydroxide having a new structure which is coated or uncoated with an anionic surface active agent.

The above and other objects and advantages of this invention will become more apparent from the following description.

The magnesium hydroxide of this invention is expressed by $Mg(OH)_2$, and has a strain, in the, $<101>$ direction, of not more than $3.0 \times 10^{-3}$. The magnesium hydroxide of this invention can be distinguished from the conventional magnesium hydroxides Mg(OH)$_2$ in that the strain of the latter is at least 3.6 × 10$^{-3}$. Usually, the strain in the <101> direction of the magnesium hydroxide of this invention is within the range of, say, 3.0 × 10$^{-3}$ to 0.1 × 10$^{-3}$. Furthermore, the magnesium hydroxide of this invention has a crystallite size in the <101> direction of more than 800 Å. This is another structural feature of the magnesium hydroxide of this invention since the crystallite sizes of the conventional magnesium hydroxides are 100 to 700 Å. Usually, the crystallite size of the magnesium hydroxide of this invention is within the range of more than 800 Å to 10,000 Å.

Furthermore, while the conventional magnesium hydroxides have a specific surface area, determined by the BET method, of 20 to 100 m$^2$/g, the specific surface area of the magnesium hydroxide of this invention determined by the same method is less than 20 m$^2$/g, for example, at least 1 m$^2$/g but less than 20 m$^2$/g.

Magnesium hydroxides of this invention having optimum improved properties have a combination of the above three characteristic structural features.

The magnesium hydroxide of this invention having the new structure described above can be obtained by the hydrothermal treatment of basic magnesium chloride or magnesium nitrate of the following formula Mg(OH)$_{2-x}$A$_x$·mH$_2$O wherein A is Cl or NO$_3$, x is a number of more than 0 but less than 0.2, and m is a number of 0 to 6, which differs from the conventional magnesium hydroxides expressed by Mg(OH)$_2$ or the conventional magnesium hydroxychloride expressed by Mg(OH)Cl, in an aqueous medium at an elevated pressure.

The basic magnesium chloride or magnesium nitrate of the above formula can be formed by reacting magnesium chloride or magnesium nitrate with an alkaline substance in an aqueous medium, the amount of the alkaline substance being a controlled amount with respect to the magnesium chloride or magnesium nitrate, preferably 0.3 to 0.95 equivalent, more preferably 0.5 to 0.95 equivalent, per equivalent of the latter.

In the preparation of the compound of formula Mg(OH)$_{2-x}$A$_x$·mH$_2$O used in the manufacture of the magnesium hydroxide of this invention, it is preferred that the equivalent ratio of [OH] of the alkaline substance to [Mg$^{2+}$] of the magnesium chloride or magnesium nitrate be maintained at 2[OH]/[Mg$^{2+}$] = 0.3 − 0.95, and also a sufficient amount of a chlorine ion be present during the reaction. Favorable results can be obtained by adding the alkaline substance, for example, calcium hydroxide, in a controlled amount meeting the above equivalent relationship to an aqueous solution containing, for example, calcium chloride as well as magnesium chloride. Mg(OH)$_2$ obtained by conventional processes cannot become a magnesium hydroxide having the new structure described hereinabove even when it is heated in an aqueous medium at an elevated temperature. Basic magnesium nitrate can be prepared in the same way as above except that magnesium nitrate is used instead of magnesium chloride, and can equally be used in the preparation of the novel Mg(OH)$_2$ of this invention.

The reaction of forming basic magnesium chloride or magnesium nitrate is carried out at a temperature of about 0° to about 50° C., preferably at about 10° to about 20° C. The reaction is carried out in an aqueous medium under conditions such that the magnesium chloride or magnesium nitrate can be fully contacted with the alkaline substance. For example, this can be accomplished by adding calcium hydroxide in an amount to satisfy the above-mentioned equivalent relation to an aqueous solution of magnesium chloride, magnesium nitrate or both magnesium chloride and calcium chloride. Examples of the alkaline substance are calcium hydroxide, ammonia and alkali metal hydroxides.

The magnesium hydroxide having the novel structure in accordance with this invention can be produced by heating the basic magnesium chloride or basic magnesium nitrate Mg(OH)$_{2-x}$A$_x$·mH$_2$O formed by the method described above, in an aqueous medium at an elevated pressure, preferably at least about 5 Kg/cm$^2$, for example, about 5 to 30 Kg/cm$^2$. At this time, it is not necessary to isolate the basic magnesium chloride from the reaction mixture containing it, but the reaction mixture can be direcly heated at an elevated pressure. This procedure is preferred. The magnesium hydroxide having the new structure in accordance with this invention cannot be formed even when ordinary magnesium hydroxide or known magnesium hydroxychloride is heated in the same way in an aqueous medium at an elevated pressure. The basic magnesium chloride or magnesium nitrate Mg(OH)$_{2-x}$A$_x$·mH$_2$O may be those which are prepared by other procedures. The heat-treatment at an elevated pressure can be performed at a temperature of, say, about 150° to about 250° C.

As compared with the conventional magnesium hydroxides, the magnesium hydroxide having the new structure described hereinabove has a markedly small strain in the <101> direction, a large crystallite size in the same direction, and a very low specific surface area determined by the BET method. Because of these structural characteristics, the surface polarity of the crystallites is extremely small or nearly zero, and the secondary aggregation of the crystallites does not appreciably occur. In addition, the magnesium hydroxide of this invention is non-bulky, and has a low concentration of vacancy. This serves to overcome the disadvantages of the poor affinity of magnesium hydroxide with resins, poor shapability, or poor surface characteristics of the shaped articles which are associated with the incorporation of the conventional magnesium hydroxides in thermoplastic resins. Also, the defect of the deteriorated physical strength of the shaped articles can be eliminated.

The strain in the <101> direction, the crystallite size in the same direction, and the specific surface area by the BET method are measured by the following methods.

Method of measuring the strain in the <101> direction and the crystallite size

On the basis of the following expression, $$\frac{\sin \theta}{\lambda}$$

is plotted in the axis of abscissas, and $$\frac{\beta \cos \theta}{\lambda}$$

in the axis of ordinates. The crystallite size ($\epsilon$) is sought from the inverse number of the intercept, and the strain ($\eta$) is obtained by multiplying the gradient by $\frac{1}{2}$.

$$\frac{\beta\cos\theta}{\lambda} = \frac{1}{\epsilon} + 2\eta\frac{\sin\theta}{\lambda}$$

wherein $\lambda$ is the wavelength of X-rays used (when they are Cu-K$_\alpha$ rays, the wavelength is 1.542 Å. $\theta$ is the Bragg's angle; and $\beta$ is the true half-maximum breadth in radian.

In the above equation, $\beta$ is determined by the following method.

The diffraction profiles of the (101) and (202) planes are measured using Cu-K$_\alpha$ rays generated at 35 KV and 15 mA as a source of X-rays. The measuring conditions are as follows:

| Velocity of the goniometer: ¼°/min. | | |
|---|---|---|
| Chart velocity: 10 mm/min. | | |
| Slit width: | (101) planes | (202) planes |
| Divergence slit: | 1° | 2° |
| Receiving slit: | 0.3 mm | 0.3 mm |
| Scattering slit: | 1° | 2° |

Figure 3:
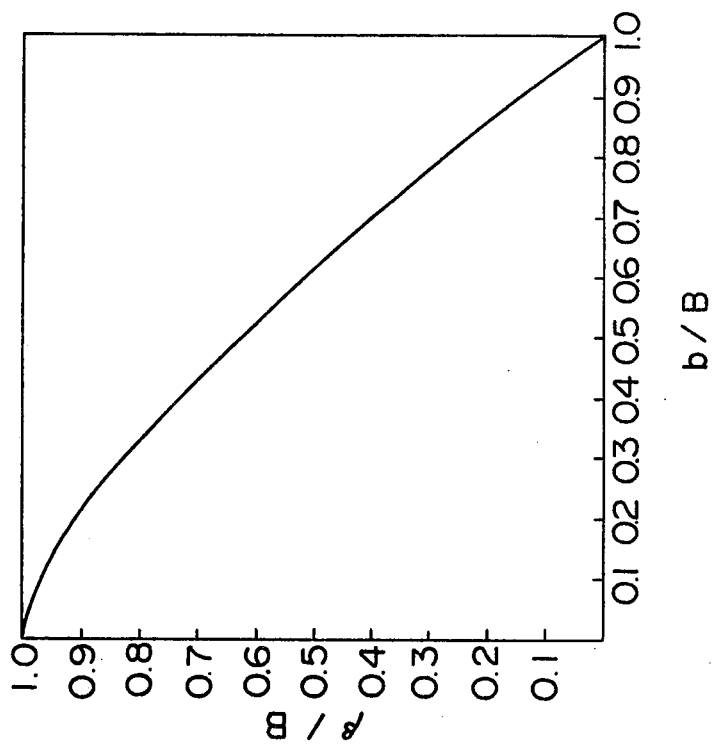
Figure 2:
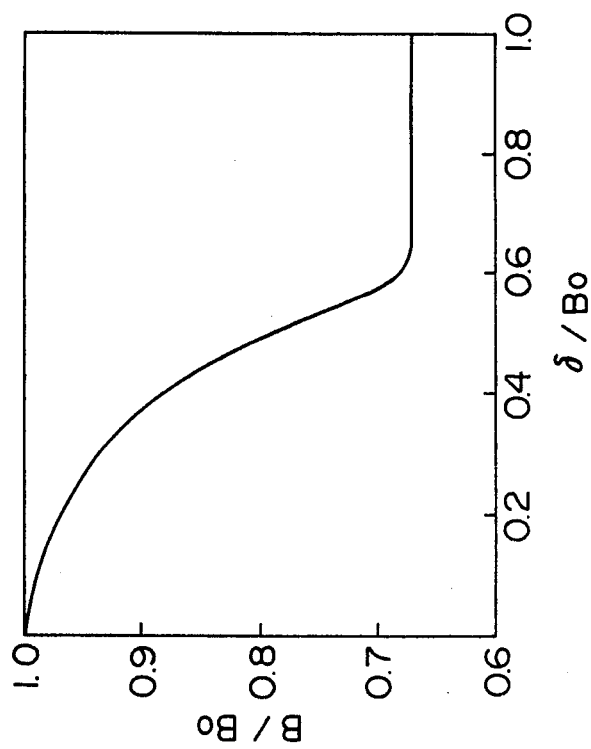

With regard to the profiles obtained, the width (B$_o$) at a height half of the height from the background to the diffraction peak is measured. From the relation of the split width ($\delta$) of K$_{\alpha 1}$ and K$_{\alpha 2}$ to $2\theta$ shown in FIG. 1 of the accompanying drawings, $\delta$ of the (101) and (202) planes to $2\theta$ is read. Then, on the basis of the B$_o$ and $\delta$ values, B is determined from the relation between $\delta/B_o$ and $B/B_o$ shown in FIG. 2. The diffraction profiles of high purity (99.999%) silicon are measured at slit widths $\frac{1}{4}$°–0.3 mm–$\frac{1}{2}$°, and the half-maximum breadth (b) is determined. This half-maximum breadth is plotted against $2\theta$ to make a graphic representation showing the relation between b and $2\theta$. From b corresponding to $2\theta$ in the (101) and (202) planes, b/B is determined, as shown in FIG. 3. $\beta$ is determined from the relation between b/B and $\beta/B$.

Method of measuring the specific surface area by the BET method

Using a nitrogen adsorption isotherm method, the specific surface area is determined by a three-point plotting of nitrogen adsorption isotherm at $-196°$ C. In the calculation, the cross sectional area of N$_2$ molecules adsorbed is set at 16.2 Å$^2$. The specimens are subjected to the nitrogen adsorption test after having been evacuated in vacuum at 100° C. for 30 minutes.

Known basic magnesium chlorides whose existence have been confirmed and which have been registered at ASTM are listed below. The numbers in the last column represent values for x.

| ASTM No. | Formula | Mg(OH)$_{2-x}$Cl$_x$ · mH$_2$O |
|---|---|---|
| 12-116 | Mg$_3$Cl$_2$(OH)$_4$ · 4H$_2$O | 2/3 |
| 12-122 | Mg$_3$Cl(OH)$_5$ · 4H$_2$O | 1/3 |
| 12-123 | Mg$_{10}$Cl$_2$(OH)$_{18}$ · 5H$_2$O | 1/5 |
| 12-131 | Mg$_2$Cl(OH)$_3$ · 4H$_2$O | 1/2 |
| 7-403 | Mg$_2$(OH)$_3$Cl · 3H$_2$O | 1/2 |
| 7-409 | MgCl$_2$ · 9Mg(OH)$_2$ · 5H$_2$O | 1/5 |
| 7-412 | Mg$_2$(OH)$_3$Cl · 4H$_2$O | 1/2 |
| 7-416 | Mg$_3$(OH)$_5$Cl · 3H$_2$O | 1/3 |
| 7-420 | Mg$_3$(OH)$_5$Cl · 4H$_2$O | 1/3 |
| 7-419 | Mg$_2$(OH)$_3$ · Cl · 2H$_2$O | 1/2 |
| 3-0100 | Mg(OH)Cl | 1 |
| 12-410 | $\beta$-Mg$_2$(OH)$_3$Cl | 1/2 |
| 11-328 | Mg(OH)Cl | 1 |

| ASTM No. | Formula | Mg(OH)$_{2-x}$Cl$_x$ · mH$_2$O |
|---|---|---|
| 12-133 | Mg$_3$Cl$_2$(OH)$_4$ · 2H$_2$O | 2/3 |

As will be clear from the above list, ASTM No. 12-123 and No. 7-409 in which x is (1/5=0.2) smallest among those listed above are most similar to the basic magnesium chloride of this invention. The X-ray diffraction data of these known compounds described by ASTM and the X-ray diffraction data of the novel basic magnesium chloride of this invention measured by the same method are tabulated below.

ASTM No. 12-123:-

| dÅ | I/I$_1$ | dÅ | I/I$_1$ |
|---|---|---|---|
| 11.2 | 60 | 2.04 | 40 |
| 7.99 | 100 | 1.97 | 10 |
| 7.31 | 100 | 1.85 | 10 |
| 5.87 | 20 | 1.72 | 10 |
| 4.12 | 40 | 1.68 | 10 |
| 4.04 | 40 | 1.58 | 40 |
| 3.64 | 40 | 1.55 | 60 |
| 3.07 | 20 | 1.52 | 10 |
| 2.76 | 10 | 1.51 | 20 |
| 2.63 | 60 | 1.48 | 10 |
| 2.53 | 40 | 1.45 | 40 |
| 2.43 | 20 | | |
| 2.40 | 100 | | |
| 2.26 | 60 | | |
| 2.24 | 40 | | |

ASTM No. 7-409:-

| dÅ | I/I$_1$ | hkl |
|---|---|---|
| 11.1 | 25 | 002 |
| 7.93 | 100 | 100 |
| 7.27 | 55 | 10$\bar{2}$ |
| 5.87 | 20 | 102 |
| 4.11 | 30 | 104 |
| 4.03 | 25 | 20$\bar{2}$ |
| 3.68 | 6 | 10$\bar{6}$,006 |
| 3.63 | 20 | 20$\bar{4}$ |
| 3.48 | 4 | 202 |
| 3.08 | 4 | 106 |
| 3.07 | 4 | 20$\bar{6}$ |
| 2.788 | 2 | 11$\bar{3}$ |
| 2.758 | 4 | 008 |
| 2.636 | 25 | 113 |
| 2.629 | 4 | 30$\bar{4}$ |
| 2.531 | 4 | 11$\bar{5}$ |
| 2.484 | 12 | 21$\bar{1}$ |
| 2.436 | 10 | 21$\bar{3}$ |
| 2.404 | 90 | 211 |
| 2.344 | 4 | 105 |
| 2.261 | 60 | 10$\overline{10}$ |
| 2.144 | 14 | |
| 1.977 | 2 | |
| 1.888 | 2 | |
| 1.866 | 4 | |
| 1.852 | 2 | |
| 1.840 | 2 | |
| 1.800 | 2 | |
| 1.724 | 4 | |
| 1.709 | 3 | |
| 1.696 | 10 | |
| 1.626 | 2 | |
| 1.590 | 13 | |
| 1.575 | 2 | |
| 1.565 | 35 | 020 |
| 1.537 | 12 | |
| 1.529 | 8 | |
| 1.523 | 16 | |
| 1.507 | 2 | |

Basic magnesium chloride of the invention:

Table 1

| d(Å) | I/I$_1$ | hkl |
|---|---|---|
| 8.18 | 100 | 003 |
| 4.09 | 48 | 006 |
| 2.704 | 27 | 101 |

Table 1-continued

| d(Å) | I/I₁ | hkl |
|---|---|---|
| 2.263 | 34 | 106 |
| 2.030 | 9 | 108 |
| 1.563 | 39 | 110 |
| 1.536 | 14 | 113 |

(Note)
The hexagonal lattice constants are $a_o \div 3.13$ Å, $c_o$ 24.6 Å.

It is clear from the above X-ray diffraction data that the magnesium chloride $Mg(OH)_{2-x}Cl_x \cdot mH_2O$ of this invention has the novel structure different from the structures of the known compounds.

Similar data to those in Table 1 of the novel basic magnesium nitrate, an intermediate, of this invention represented by the formula $Mg(OH)_{2-x}(NO_3)_x \cdot H_2O$ are shown in Table 2 below. The existence of basic magnesium nitrate is not described by ASTM.

Table 2

| d(Å) | I/I₁ | hkl |
|---|---|---|
| 8.18 | 100 | 003 |
| 4.07 | 42 | 006 |
| 2.650 | 15 | 102 |
| 2.366 | 15 | 105 |
| 2.021 | 9 | 108 |
| 1.563 | 19 | 110 |
| 1.536 | 9 | 113 |

(Note)
The hexagonal lattice constants are $a_o \div 3.12$ Å, $c_o \div 24.4$ Å.

If desired, the magnesium hydroxide of the invention may be treated with an anionic surface active agent to form solid particles of magnesium hydroxide coated with the surfactant. This form is more preferred in using it as a fire retardant or a fire-retarding filler for thermoplastic resins or water-soluble paints. The coating can be performed by contacting the magnesium hydroxide with anionic surfactants. For example, an aqueous solution of a desired amount of an anionic surfactant is mixed with solid particles of the magnesium hydroxide under conditions such that they contact each other sufficiently intimately, for example, by agitating them sufficiently, or by hydrothermal treatment at 120° to 250° C. thereby to form a solid powder of magnesium hydroxide coated with the anionic surfactant. By this contacting operation, the surfactant is chemically adsorbed onto the surface of the solid particles of the magnesium hydroxide, and this can lead to more improved properties when the magnesium hydroxide is incorporated in thermoplastic synthetic resins or water-soluble paints.

The amount of the anionic surfactant to be coated can be adjusted optionally. Solid powder of the magnesium hydroxide of this invention coated by using an aqueous solution containing about 5 millimoles to about 30 millimoles, per liter of water, of the surfactant is preferred, for example. The amount of the anionic surfactant adsorbed onto the solid particles of the magnesium hydroxide of this invention is preferably about ¼ to about 3 times, more preferably about 1 to about 2.5 times, the amount (X in millimoles) required to coat the entire surface of the solid particles (one gram) with a monolayer of the surfactant molecules. The amount X (millimoles) can be calculated in accordance with the following equation.

$$X = \frac{Y}{6.02 \times C} \text{ (millimoles)}$$

wherein C is the absolute value of the adsorption cross-sectional area [(Å)²] per molecule of the anionic surfactant used, and Y is the absolute value of the specific surface area (m²/g) of the magnesium hydroxide of this invention.

According to this invention, there can be provided a composition containing uncoated magnesium hydroxide of this invention or the magnesium hydroxide of this invention coated with an anionic surface active agent. For example, compositions having improved properties, especially those useful for melt shaping, can be provided by incorporating the coated or uncoated magnesium hydroxide of this invention in a thermoplastic synthetic resin, preferably those having great hydrophobicity and great non-polarity, as a fire retardant or fire-retarding filler in an amount of about 50 to about 250 parts by weight per 100 parts by weight of the resin. Examples of the thermoplastic synthetic resin include styrene resins such as a homo- or copolymer of styrene, olefin resins such as homo- or co-polymers of olefins, polyester resins, polycarbonate resins, nylon resins, acetal resins, and blends of these resins. These compositions may be provided in the form of melt-shaped articles. Furthermore, by incorporating the coated or uncoated magnesium hydroxide of this invention in paints or lacquers in an amount of about 5 to about 150 parts by weight per 100 parts by weight of the resin vehicle, paint compositions having improved properties can be obtained.

Various conventional additives may further be incorporated in the thermoplastic synthetic resin compositions or paint compositions in accordance with this invention.

Examples of these additives are coloring agents (organic and inorganic pigments) such as isoindolinone, cobalt aluminate, carbon black, or cadmium sulfide; other fillers such as calcium carbonate, alumina, zinc oxide or talc; antioxidants such as 2,6-di-t-butyl-4-methylphenol, 2,2'-methylenebis (4-methyl-6-t-butylphenol), dilauryl thiodipropionate or tridecyl phoshite; ultraviolet absorbers such as 2-hydroxy-4-methoxy benzophenone, 2(2'-hydroxy-5'-methylphenyl) benzotriazole, 2-ethylhexyl-2-cyano-3,3-diphenyl acrylate, phenyl salicylate or nickel-bisoctyl phenyl sulfide; plasticizers such as di-2-ethyl hexyl phthalate, di-n-butyl phthalate, butyl stearate, or epoxidized soybean oil; and lubricants such as zinc stearate, calcium, aluminium and other metal soaps, or polyethylene wax.

These additives can be used in customary amounts. For example, the amount of the coloring agent is about 0.1 to about 3 parts by weight; the amount of the other filler is up to about 20 parts by weight; the amount of the antioxidant or ultraviolet absorber is about 0.001 to about 5 parts by weight; the amount of the plasticizer is up to about 20 parts by weight; and the amount of the lubricant is up to about 10 parts by weight. All these amounts are based on 100 parts by weight of the resin component.

The anionic surface active agent used to coat the magnesium hydroxide of this invention includes, for example, alkali metal salts of higher fatty acids of the formula

RCOOM wherein R is an alkyl group containing 8 to 30 carbon atoms, and M is an alkali metal atom, alkyl sulfate salts of the formula

ROSO$_3$M wherein R and M are the same as defined above, alkylsulfonate salts of the formula

RSO$_3$M wherein R and M are the same as defined above, alkylaryl sulfonate salts of the formula R—aryl—SO$_3$M wherein R and M are the same as defined above, and sulfosuccinate ester salts of the formula

ROCOCH$_2$
|
ROCOCHSO$_3$M wherein R and M are the same as defined above. These anionic surfactants can be used either alone or in admixture of two or more.

Specific examples of the surface active agent are sodium stearate, potassium behenate, sodium montanate, potassium stearate, sodium oleate, potassium oleate, sodium palmitate, potassium palmitate, sodium laurate, potassium laurate, sodium dilaurylbenzenesulfonate, potassium octadecylsulfate, sodium laurylsulfonate or disodium 2-sulfoethyl α-sulfostearate.

The following Examples and Comparative Examples illustrate the present invention more specifically.

EXAMPLE 1

Five liters of an aqueous solution of magnesium chloride with a concentration of 1.5 moles/liter (the temperature of the solution was 15° C.) was placed in a reaction vessel having a capacity of about 10 liters, and the solution was sufficiently stirred by means of a stirrer. An ammonia solution with a concentration of 10 moles/liter (the temperature of the solution was 15° C.) was added in an amount of 1.35 liters (corresponding to 0.9 equivalent of the magnesium chloride, i.e. per equivalent of magnesium chloride) over the course of about 10 minutes.

A part of the resulting suspension was immediately filtered at reduced pressure, and then washed thoroughly with water and then with acetone. The product was dried for about 2 hours at room temperature, and analyzed by X-ray diffraction and by a chemical analysis method. By the X-ray diffraction, the product was identified as basic magnesium chloride having the structure defined in the present invention. The chemical analysis showed that this product had the composition Mg(OH)$_{1.903}$Cl$_{0.097}$·mH$_2$O. The presence of water of crystallizaton was confirmed by DTA and TGA. Immediately after the reaction, a greater portion of the remaining suspension was placed in a 20-liter autoclave, and hydrothermally treated at 180° C. for 8 hours. This heat-treatment was carried out within about 2 hours from the end of the reaction because this unstable substance had to be treated while it remained undecomposed. After the hydrothermal treatment, the product was filtered at reduced pressure, washed with water and dried. The product obtained was identified as magnesium hydroxide by X-ray diffraction. It had a strain in the <101> direction of 0.970 × 10$^{-3}$, a crystallite size in the <101> direction of 4200 Å, and a specific surface area by the BET method of 6.7 m$^2$/g.

EXAMPLE 2

The same procedure as in Example 1 was performed except that the ammonia solution was added in an amount of 1.05 liters (corresponding to 0.7 equivalent of magnesium chloride) over the course of about 7 minutes. A part of the resulting suspension was immediately filtered at reduced pressure, and then thoroughly washed with water and then with acetone. The resulting product was subjected to an X-ray diffraction analysis and a chemical analysis. By the X-ray diffraction, it was identified as the novel substance shown in Table 1. The chemical analysis showed that this product had the composition Mg(OH)$_{1.892}$Cl$_{0.108}$·mH$_2$O.

On the other hand, the reaction mixture was placed in a 10-liter autoclave immediately after the reaction, and hydrothermally treated at 170° C. for 8 hours. The product was filtered at reduced pressure, washed with water, and dried. The resulting magnesium hydroxide had a strain in the <101> direction of 1.20 × 10$^{-3}$, a crystallite size in the <101> direction of 5260 Å, and a specific surface area, by the BET method, of 4.2 m$^2$/g.

EXAMPLE 3

The same procedure as in Example 1 was performed except that 1.425 liters (corresponding to 0.95 equivalent of the magnesium chloride) of the ammonia solution was added over the course of about 10 minutes. A part of the reaction mixture was removed, and the remainder was immediately transferred to a 10-liter autoclave where it was hydrothermally treated at 200° C. for 4 hours.

The reaction mixture previously removed, immediately after the reaction, was filtered at reduced pressure, and washed with water and then with acetone. The product was subjected to an X-ray diffraction analysis and a chemical analysis. The X-ray diffraction showed that the product was the novel substance shown in Table 1. The chemical analysis showed that the product had the composition Mg(OH)$_{1.931}$Cl$_{0.069}$·mH$_2$O.

The hydrothermally treated product was filtered at reduced pressure, washed with water, and then dried.

The resulting magnesium hydroxide had a strain in the <101> direction of 2.05 − 10$^{-3}$, a crystallite size in the <101> direction of 2840 Å, and a specific surface area, by the BET method, of 8.9 m$^2$/g.

EXAMPLE 4

Ten liters of a mixed aqueous solution of magnesium chloride and calcium chloride (the by-product from the process of producing sodium chloride from sea water by an ion-exchange membrane method; Mg$^{2+}$ = 1.58 mole/liter, Ca$^{2+}$ = 0.765 mole/liter) and 8.2 liters (corresponding to 0.8 equivalent of magnesium chloride) of an aqueous solution of calcium hydroxide in a concentration of 1.54 mole/liter were each maintained at 30° C. One liter of water was placed in a 2-liter reactor equipped with an overflowing device, and stirred by a stirrer. The temperature of the water was adjusted to 30° C. Using metering pumps, the mixed aqueous solution of magnesium chloride and calcium chloride and the aqueous solution of calcium hydroxide were fed into the reactor at a feed rate of 100 ml/min., and 82 ml/min., respectively to perform the reaction. After the reaction, 16 liters of the resulting suspension was immediately transferred to a 30-liter autoclave, and hydrothermally treated at 145° C. for 8 hours. The remainder of the reaction mixture was filtered at reduced pressure, washed with water and acetone, and dried at room temperature for 4 hours. The product was subjected to an X-ray diffraction analysis and a chemical analysis. The X-ray diffraction showed that the product was the novel substance shown in Table 1. As a result of the chemical analysis, this product was found to have the composition $Mg(OH)_{1.909}Cl_{0.091}\cdot mH_2O$. The hydrothermally treated product was filtered at reduced pressure, washed with water, and dried. The magnesium hydroxide so obtained had a strain in the <101> direction of $1.80 \times 10^{-3}$, a crystallite size in the <101> direction of 2250 Å, and a specific surface area by the BET method of 12.7 m$^2$/g.

EXAMPLE 5

Two liters of an aqueous solution of magnesium nitrate in a concentration of 2 mole/liter (the temperature of the solution was 15° C.) was placed in a reactor with a capacity of about 5 liters, and stirred thoroughly by a stirrer. Ammonia solution (at 15° C.) in a concentration of 4 mole/liter was added in an amount of 1.8 liters (corresponding to 0.9 equivalent of the magnesium nitrate) over the course of about 20 minutes. Two liters of the resulting suspension was immediately transferred to a 5-liter autoclave, and hydrothermally treated at 170° C. for 4 hours. The remainder (1.8 liters), immediately after the reaction, was filtered at reduced pressure, and thoroughly washed with acetone. The product was subjected to an X-ray diffraction analysis and a chemical analysis. The product was identified by the X-ray diffraction as the novel substance shown in Table 2. The chemical analysis showed that the product had the composition $Mg(OH)_{1.827}(NO_3)_{0.173}\cdot mH_2O$. The hydrothermally treated product was filtered at reduced pressure, washed with water, and dried. The magnesium hydroxide so obtained had a strain in the <101> direction of $2.40 \times 10^{-3}$, a crystallite size in the <101> direction of 4200 Å, and a specific surface area by the BET method of 9.6 m$^2$/g.

COMPARATIVE EXAMPLE 1

Two liters of an aqueous solution of magnesium chloride in a concentration of 1.5 moles/liter was maintained at 40° C., and thoroughly stirred. An aqueous solution of calcium hydroxide in a concentration of 1.5 moles/liter was added to the stirred magnesium chloride solution in an amount of 2 liters (correspondding to one equivalent of the magnesium chloride) over the course of about 60 minutes. The reaction mixture obtained was filtered at reduced pressure, and washed with water. The product was filtered, and dried at 80° C. for 10 hours. The resulting product was identified as magnesium hydroxide by an X-ray diffraction analysis. The product washed with water was suspended in 6 liters of water, and hydrothermally treated at 250° C. for 8 hours in a 10-liter autoclave. The hydrothermally treated product was filtered at reduced pressure, washed with water, and dried. The product obtained had a strain in the <101> direction of $3.70 \times 10^{-3}$, a crystallite size in the <101> direction of 568 Å, and a specific surface area by the BET method of 32 m$^2$/g. The compound before the hydrothermal treatment had a strain in the <101> direction of $4.76 \times 10^{-3}$, a crystallite size in the <101> direction of 549 Å, and a specific surface area by the BET method of 21 m$^2$/g.

COMPARATIVE EXAMPLE 2

Four liters of an aqueous solution of magnesium chloride in a concentration of 1.5 moles/liter, and 4 liters of an aqueous solution of calcium hydroxide in a concentration of 2.0 moles/liter were each maintained at 20° C. 500 ml of water was placed in a 1.5-liter reactor equipped with an overflowing device, and thoroughly stirred. Using metering pumps, the above aqueous solutions were each fed into the reactor at a rate of 40 ml/min. The amount of the alkali fed was adjusted to one equivalent per equivalent of magnesium chloride. In about 100 minutes, the reaction ended. A part of the resulting suspension was filtered at reduced pressure, and washed with water and acetone. The product was analyzed by X-ray diffraction and found to be magnesium hydroxide. The remainder of the suspension, immediately after the reaction, was transferred to a 10-liter autoclave, and hydrothermally treated at 170° C. for 8 hours. The hydrothermally treated product was filtered at reduced pressure, washed with water, and dried. The product had a strain in the <101> direction of $3.70 \times 10^{-3}$, a crystallite particle size in the <101> direction of 647 Å, and a specific surface area by the BET method of 26 m$^2$/g. The compound before the hydrothermal treatment had a strain in the <101> direction of $4.83 \times 10^{-3}$, a crystallite particle size in the <101> direction of 476 Å, and a specific surface area by the BET method of 31 m$^2$/g.

EXAMPLE 6

2.2 Kg of the magnesium hydroxide obtained in Example 2 having a strain of $1.20 \times 10^{-3}$, a crystallite particle size of 5260 Å, and a specific surface area of 4.2 m$^2$/g was further dried at 150° C. for 3 hours, and mixed with 1.8 Kg of polypropylene having a melt index of 6.0 and a density of 0.91 by a Henschel mixer. The composition was heated to about 230° C., and melt-kneaded in an extruder. The resulting resin composition was injection-molded into a plate. The physical properties and fire retardancy of the plate were evaluated by the ASTM standards and the UL standards. The results obtained are shown in Table 3.

EXAMPLE 7

2.2 Kg of the magnesium hydroxide obtained in Example 1 was placed in 10 liters of an aqueous solution of sodium stearate in a concentration of $10 \times 10^{-3}$ mole/liter. The mixture was maintained at 80° C. for 2 hours with stirring to coat the surface of the magnesium hydroxide with the sodium stearate. The product was filtered at reduced pressure, washed with water, and dried. Using the resulting dried product instead of the magnesium hydroxide used in Example 6, the same procedure as in Example 6 was performed. The results are shown in Table 3.

COMPARATIVE EXAMPLE 3

The same procedure as in Example 6 was performed except that 2.2 Kg of the magnesium hydroxide obtained in Comparative Example 1 having a strain of $4.76 \times 10^{-3}$, a crystallite size of 549 Å, and a specific surface area of 21 m$^2$/g was used instead of the magnesium hydroxide used in Example 6. The results are shown in Table 3.

COMPARATIVE EXAMPLE 4

The same procedure as in Example 6 was performed except that the magnesium hydroxide obtained in Comparative Example 2 having a strain of 3.70 × 10⁻³, a crystallite particle size of 647 Å, and a specific surface area of 26 m²/g was used instead of the magnesium hydroxide used in Example 6. The results are shown in Table 3.

CONTROL EXAMPLE 1

The polypropylene alone used in Example 6 was molded in the same way as in Example 6. The results are shown in Table 3.

Table 3

| Runs | Injection pressure (*1) | Appearance of the surface of the shaped article | Izod impact strength (*2) | Tensile elongation (*3) | Fire retardancy (*4) |
| --- | --- | --- | --- | --- | --- |
| Example 6 | 105 | No silver pattern | 3.9 | 9.7 | V-O |
| Example 7 | 96 | No silver pattern | 5.2 | 21.0 | V-O |
| Comparative Example 3 | 180 | Silver pattern present | 0.8 | 1.9 | HB |
| Comparative Example 4 | 148 | Silver pattern present | 1.1 | 2.1 | HB |
| Control Example 1 | 100 | No silver pattern | 7.1 | >100 | Combustible |

(1*) Relative values of the injection pressure based on that used in molding polypropylene alone.
(*2) ASTM D256 (Kg-cm/cm)
(*3) ASTM D638 (%)
(*4) UL standards 94 VE

EXAMPLES 8 to 15 and CONTROL EXAMPLES 2 to 5

The same procedure as in Example 6 was performed except that 100 parts by weight of each of the thermoplastic resins shown in Table 4 was blended with each of the uncoated magnesium hydroxide used in Example 6 and the magnesium hydroxide coated in the same manner as in Example 7 with each of the anionic surfactants shown in Table 4, and each of the resulting compositions was injection-molded at the pressures and temperatures shown in Table 4. The results obtained are shown in Table 4.

Table 4

| Run | Resin | Amount of magnesium hydroxide (parts by weight per 100 parts by weight of resin) | Surface active agent Compound | Surface active agent Amount coated (% by weight based on Mg(OH)₂) | Molding temperature (°C.) | Injection pressure (*1) | Appearance of the molded article | Izod impact strength (*2) | Tensile elongation (*3) | Fire retardancy (*4) |
| --- | --- | --- | --- | --- | --- | --- | --- | --- | --- | --- |
| Ex. 8 | Polyethylene | uncoated (135) | | | 230–240 | 108 | No silver pattern | 2.1 | 18.1 | V-O |
| Ex. 9 | | coated (135) | Sodium oleate | 4.0 | " | 80 | No silver pattern | 3.4 | 29.5 | V-O |
| Con.2 | | Mg(OH)₂ not added | | | " | 100 | No silver pattern | 5.0 | >500 | — |
| Ex.10 | Polystyrene | uncoated (125) | | | 240–250 | 105 | No silver pattern | 2.2 | 1.9 | V-O |
| Ex.11 | | coated (125) | Sodium lauryl benzenesulfonate | 6.5 | " | 87 | No silver pattern | 4.1 | 2.6 | V-O |
| Con.3 | | Mg(OH)₂ not added | | | " | 100 | No silver pattern | 7.0 | 35.0 | — |
| Ex.12 | ABS (*5) | uncoated (125) | | | 250–260 | 110 | No silver pattern | 18 | 2.9 | V-O |
| Ex.13 | | coated (125) | Sodium behenate | 9.2 | " | 90 | No silver pattern | 21 | 4.1 | V-O |
| Con.4 | | Mg(OH)₂ not added | | | " | 100 | No silver pattern | 40 | 50 | — |
| Ex.14 | Nylon 6 | uncoated (120) | | | 290–300 | 110 | Silver pattern present | 8.3 | 4.2 | V-O |
| Ex.15 | | coated (120) | Sodium montanate | 8.7 | " | 92 | No silver pattern | 14.1 | 6.0 | V-O |
| Con.5 | | Mg(OH)₂ not added | | | " | 100 | No silver pattern | 19.0 | 65 | — |

Note:
(*1) to (*4) are the same as the footnote to Table 3.
(*5) ABS is an acrylonitrile/butadiene/styrene copolymer with a weight ratio of 20/23/57.

What we claim is:

1. A magnesium hydroxide of the following formula $$Mg(OH)_2$$

which has (i) a strain in the <101> direction of not more than 3.0 × 10⁻³, (ii) a crystallite size in the <101> direction of more than 800 Å, and (iii) a specific surface area, determined by the BET method, of less than 20 m²/g.

2. A process for preparing a magnesium hydroxide of the formula $$Mg(OH)_2$$

having (i) a strain in the <101> direction of not more than 3.0 × 10⁻³, (ii) a crystallite size in the <101> direction of more than 800 Å, and (iii) a specific surface area, determined by the BET method, of less than 20 m²/g, which comprises heating a basic magnesium chloride or magnesium nitrate of the formula $$Mg(OH)_{2-x}A_x \cdot mH_2O$$

wherein A represents Cl or $NO_3$, x is a number of more than 0 but less than 0.2, and m is a number of 0 to 6, in an aqueous medium at an elevated pressure and temperature sufficient to convert said basic magnesium chloride or magnesium nitrate to said magnesium hydroxide.

3. The process of claim 2 wherein said basic magnesium chloride or magnesium nitrate is prepared by reacting magnesium chloride or magnesium nitrate with an alkaline substance, selected from the group consisting of calcium hydroxide, ammonia and an alkali metal hydroxide, in an aqueous medium, the amount of the alkaline substance being 0.3 to 0.95 equivalent per equivalent of the magnesium chloride or magnesium nitrate.

4. The process of claim 2 wherein the basic magnesium chloride or magnesium nitrate is heated in an aqueous medium at a temperature of from about 150° to about 250° C. and a pressure of at least about 5 $Kg/cm^2$.

* * * * *